United States Patent
Abouelwafa et al.

(10) Patent No.: US 11,755,226 B2
(45) Date of Patent: Sep. 12, 2023

(54) TRACKING CHANGES OF STORAGE VOLUMES DURING DATA TRANSFERS

(71) Applicant: HEWLETT PACKARD ENTERPRISE DEVELOPMENT LP, Houston, TX (US)

(72) Inventors: Ayman Abouelwafa, Folsom, CA (US); Murali Vaddagiri, Austin, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/025,080

(22) Filed: Sep. 18, 2020

(65) Prior Publication Data

US 2022/0091770 A1     Mar. 24, 2022

(51) Int. Cl.
    *G06F 3/06*      (2006.01)

(52) U.S. Cl.
    CPC ............ *G06F 3/0647* (2013.01); *G06F 3/065* (2013.01); *G06F 3/067* (2013.01); *G06F 3/0619* (2013.01)

(58) Field of Classification Search
    CPC ...... G06F 3/0647; G06F 3/0619; G06F 3/065; G06F 3/067
    See application file for complete search history.

(56) References Cited

U.S. PATENT DOCUMENTS

| | | | |
|---|---|---|---|
| 5,835,954 A | 11/1998 | Duyanovich et al. | |
| 6,108,748 A | 8/2000 | Ofek et al. | |
| 6,823,349 B1 | 11/2004 | Taylor et al. | |
| 7,024,527 B1 * | 4/2006 | Ohr | G06F 11/1469 100/154 |
| 7,143,308 B2 | 11/2006 | Tseng et al. | |
| 7,305,579 B2 | 12/2007 | Williams | |
| 7,546,485 B2 | 6/2009 | Cochran et al. | |
| 8,112,665 B1 | 2/2012 | Somavarapu et al. | |
| 8,200,921 B2 | 6/2012 | Cochran et al. | |
| 8,214,612 B1 * | 7/2012 | Natanzon | G06F 11/1612 707/622 |
| 8,225,138 B2 | 7/2012 | Oxrieder et al. | |
| 8,655,848 B1 | 2/2014 | Leverett et al. | |
| 8,904,133 B1 | 12/2014 | Kono et al. | |

(Continued)

OTHER PUBLICATIONS

Dell, "Dell EMC Unity: Replication Technologies", White Paper, Jan. 2021, 80 pages.

(Continued)

*Primary Examiner* — Jason W Blust
(74) *Attorney, Agent, or Firm* — Trop, Pruner & Hu, P.C.

(57) ABSTRACT

In some examples, a system transfers, in a first transfer operation, data of a first storage volume of a first storage location to a second storage volume for a second storage location. Responsive to a completion of the transfer of data of the first storage volume to the second storage volume, the system activates tracking information to track changes to data portions of the second storage volume, the tracking information comprising a plurality of indicators that map to respective different data portions of the second storage volume. As part of a second transfer operation following the first transfer operation, the system transfers changed data indicated by the tracking information from the second storage volume to the first storage volume, without transferring unchanged data in the second storage volume to the first storage volume.

20 Claims, 6 Drawing Sheets

(56) References Cited

U.S. PATENT DOCUMENTS

| | | | |
|---|---|---|---|
| 9,026,696 | B1 | 5/2015 | Natanzon et al. |
| 9,459,804 | B1* | 10/2016 | Natanzon .............. G06F 3/0619 |
| 9,639,277 | B2 | 5/2017 | Nakajima |
| 10,228,962 | B2 | 3/2019 | Dornemann et al. |
| 10,241,712 | B1 | 3/2019 | Elliott, IV et al. |
| 10,353,640 | B2 | 7/2019 | Venkat et al. |
| 10,402,113 | B2 | 9/2019 | Ray et al. |
| 10,452,503 | B2 | 10/2019 | Abouelwafa et al. |
| 10,705,927 | B2 | 7/2020 | Killamsetti et al. |
| 10,768,851 | B2 | 9/2020 | Vokaliga et al. |
| 10,776,224 | B2 | 9/2020 | Chen et al. |
| 10,956,079 | B2 | 4/2021 | Killamsetti et al. |
| 10,972,335 | B2 | 4/2021 | Rajvaidya et al. |
| 2004/0260873 | A1* | 12/2004 | Watanabe ........... G06F 11/1456 711/114 |
| 2005/0071708 | A1* | 3/2005 | Bartfai ................ G06F 11/2064 714/E11.102 |
| 2005/0193180 | A1* | 9/2005 | Fujibayashi ............ G06F 3/067 711/162 |
| 2010/0017573 | A1* | 1/2010 | Shinozaki ........... G06F 11/2094 711/E12.001 |
| 2011/0238937 | A1 | 9/2011 | Murotani et al. |
| 2012/0278567 | A1 | 11/2012 | Broido et al. |
| 2013/0042082 | A1 | 2/2013 | Tamura et al. |
| 2017/0132095 | A1 | 5/2017 | Graefe |
| 2018/0032257 | A1 | 2/2018 | Xiang et al. |
| 2019/0065382 | A1 | 2/2019 | Velayuthaperumal et al. |
| 2019/0349427 | A1 | 11/2019 | Rago et al. |
| 2020/0183601 | A1 | 6/2020 | Tamma et al. |
| 2021/0026673 | A1 | 1/2021 | Forney |
| 2021/0026867 | A1 | 1/2021 | Meiri et al. |
| 2021/0109827 | A1 | 4/2021 | Vokaliga et al. |
| 2021/0357132 | A1* | 11/2021 | Kumar ................ G06F 11/1464 |
| 2021/0374155 | A1 | 12/2021 | Xiang et al. |

OTHER PUBLICATIONS

George et al., "Bitmap and delta sync", MyZerto, available online at <https://www.zerto.com/myzerto/forums/topic/bitmap-and-delta-sync>, 2015, 2 pages.

IBM, "Metro Mirror and Global Mirror", available online at <https://www.ibm.com/docs/en/flashsystem-9x00/8.3.1?topic=csf-metro-mirror-global-mirror>, Apr. 29, 2021, 5 pages.

Infinidat Support, Overview of Replication, available online at <https://support.infinidat.com/hc/en-us/articles/360002108377-Overview-of-replication>, Apr. 29, 2021, 15 pages.

Zerto, "Zerto Virtual Manager Administration Guide", VMware vSphere Environment, 2015, pp. 1-8.

Warmuth, A. et al.; "DS8870 Data Migration Techniques"; Apr. 2015; 330 pages.

Infinidat, "Active-Active replication—INFINIDAT Support," Feb. 27, 2021, <https://web.archive.org/,veb/2021022702584 7 /hllps://support.infinidal.com/hc/en-us/articles/360002108357>.

Linux, Asymmetric Logical Unit Assignment, The Linux SCSI Target Wiki last modified on Oct. 9, 2013, 6 pages.

OpenStack Docs: "Dell EMC VNX driver", printed on: Oct. 23, 2020 from webpage: https://docs.openstack.org/clinder/queens/configuration/block-storage/drivers/dell-emc--vnx-driver.html; 22 pages.

* cited by examiner

TRACKING CHANGES OF STORAGE VOLUMES DURING DATA TRANSFERS

BACKGROUND

A storage system is used to store data for a computing device or multiple computing devices. In some examples, the storage system can be directly connected to a computing device. In other examples, the storage system is accessible over a network by a computing device.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Migration of data between different storage systems can be performed for various purposes. In some examples, migration of data can refer to copying data from a first storage location to a second storage location, in which a copy of the data is kept at the first storage location. Alternatively, migration of data can refer to moving data from the first storage location to the second storage location, in which the data is not kept at the first storage location.

A "storage location" can refer to a physical storage system (or a portion of the physical storage system) or to any collection of storage systems. A storage system can include a storage device or a collection of multiple storage devices. Examples of storage devices include disk-based storage devices, solid-state storage devices, and so forth.

Data can be migrated from a first storage location to a second storage location in any of the following scenarios: in response to a detection of errors at the first storage location, as part of upgrading a first storage system to a different (e.g., a higher performance) second storage system, to move data to a target location (e.g., a location that is physically closer to computing device(s) that is (are) to use the data, a location that is more secure than a prior location, etc.), or for any other purpose.

In some cases, data can be stored in a collection of storage volumes. A "storage volume" can refer to a virtual volume that is a logical unit of storage to store data. For example, data for a particular entity (e.g., a program, a user, a machine, etc.) can be stored in a collection of storage volumes, such as to spread the data for the particular entity across the collection of storage volumes. In further examples, the storage volumes of the collection of storage volumes can have some dependency upon one another, in which data in one storage volume is dependent upon data in another storage volume in the collection.

For purposes of data migration, a collection of storage volumes can be referred to as a "consistency set of storage volumes." A consistency set of storage volumes refers to a grouping of storage volumes that is to be migrated as a group from a first storage location to a second storage location. If any storage volume of the consistency set of storage volumes cannot be successfully migrated from the first storage location to the second storage location, then the migration of the consistency set of storage volumes does not succeed.

Migrating a storage volume refers to transferring (copying or moving) data stored by the storage volume from a source storage location to a destination storage location, which means that the data is transferred from a storage volume ("source storage volume") that is associated with the physical storage device(s) of the source storage location to a storage volume ("destination storage volume") that is associated with the physical storage device(s) of the destination storage location.

In some examples, as a collection of storage volumes is migrated from a source storage location to a destination storage location, writes can occur with respect to migrated storage volumes at the destination storage location ("destination storage volumes") that can cause changes to be made to the destination storage volumes. A "migrated storage volume" (or equivalently, a "destination storage volume") refers to a storage volume associated with the destination storage location to which data of a source storage volume associated with the source storage location has been transferred.

In some cases, changes made to the destination storage volumes may not be synchronized to corresponding source storage volumes at the source storage location. As a result, data in the source storage volumes at the source storage location may become stale. Should the data migration abort for any reason such that rollback is performed back to the source storage location, then a full offline copy of the destination storage volumes at the destination storage location may have to be performed to the source storage location, to avoid data loss as a result of the rollback. Performing a full copy of destination storage volumes may be time-consuming and can consume large amounts of resources (including processing, communication, and storage resources), particularly if the destination storage volumes are large or if a consistency set includes a large number of storage volumes.

In alternative examples, when migrating a collection of storage volumes from a source storage location to a destination storage location, the collection of storage volumes is switched together at one time from the source storage location to the destination storage location after the data migration is completed. Switching the collection of storage volumes from the source storage location to the destination storage location means that input/output (I/O) requests targeting the collection of storage volumes are redirected to the destination storage location and satisfied from the destination storage volumes, rather than from the source storage volumes at the source storage location. The redirecting of I/O requests can be performed at a host system that issued the I/O requests, at an intermediary system in a communication fabric between the host system and storage systems, and so forth.

In such alternative examples, to support the switching of the collection of storage volumes together at one time, any changes to destination storage volumes at the destination storage location during data migration can be synchronized (mirrored) to corresponding source storage volumes at the source storage location. Having to synchronize (mirror) updates made to data in destination storage volumes with corresponding source storage volumes during the data migration can consume significant resources, which may reduce storage system performance.

Moreover, in such alternative examples, once the data of the collection of storage volumes has been transferred successfully from the source storage location to the destination storage location, I/O blocking of I/O accesses targeting the collection of storage volumes can be initiated. During the I/O blocking, I/O requests received from a host system (or multiple host systems) may be stored in a queue for later processing when the I/O blocking is removed. When I/O requests are queued, a storage system may not respond to the I/O requests with success indications (e.g., positive acknowledgments) responsive to the I/O requests. As a result, the host system(s) may experience delays in receiving success indications indicating that the I/O requests were completed at the storage system. If the quantity of storage volumes in the collection of storage volumes is large, an I/O timeout may occur at a host system if the host system does not receive a success indication responsive to an I/O request issued by the host system within a specified time duration. Moreover, even if the host system were to receive success indications responsive to I/O requests within the specified time duration, the host system may detect a high latency in I/O responses, which may be undesirable.

In accordance with some implementations of the present disclosure, data migration of a consistency set of storage volumes can be performed in a more efficient manner based on use of tracking data structures maintained for respective individual storage volumes of the consistency set of storage volumes. As a given storage volume of the consistency set individually completes migration from a source storage location to a destination storage location, a tracking data structure can be activated for the given storage volume. The tracking data structure can include tracking information that tracks changes made to data portions in the given storage volume. In some examples, the tracked changes include overwriting previous data in the data portions of the given storage volume without maintaining a copy of the previous data at the destination storage location. The "previous data" in the data portions includes data previously stored in the data portions, and the tracked changes overwrites the previously stored data and a copy of the previously stored data is not maintained after the overwriting. The tracking data structure can have any of various forms, such as a tracking bitmap (including a series or an array of bits that represent whether or not corresponding data portions of the storage volume has been changed).

More generally, the tracking information of a tracking data structure can include indicators that map to corresponding data portions of a storage volume. An "indicator" can be made up of a single data bit or a collection of data bits. An indicator can be set to one of multiple values. A first value of the indicator can indicate that a corresponding data portion has not been changed. A second value of the indicator can indicate that a corresponding data portion has been changed.

Figure 1:
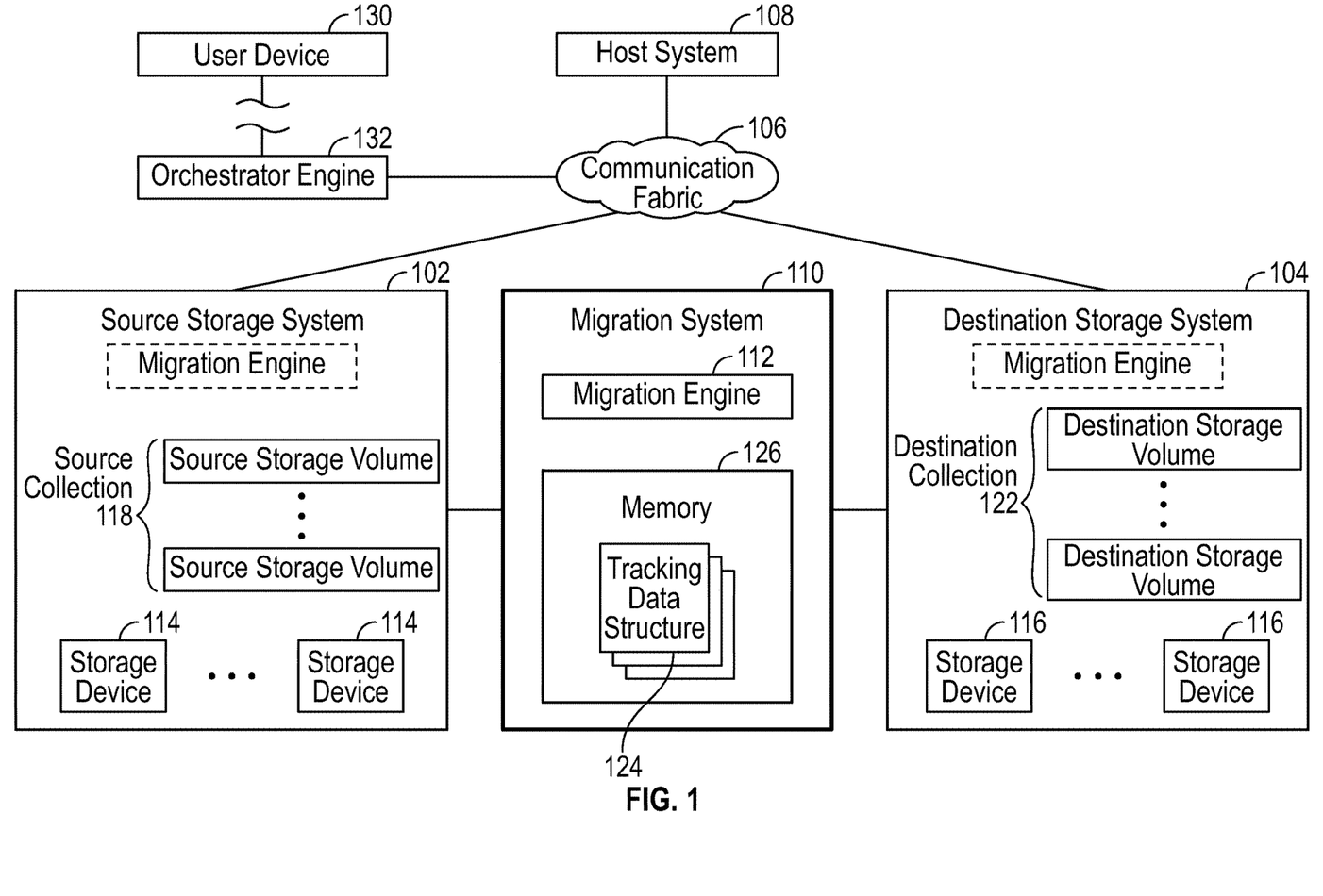
FIG. 1 is a block diagram of an arrangement to transfer data between storage volumes, according to some examples.

FIG. 1 is a block diagram of an example arrangement that includes a source storage system 102 and a destination storage system 104. The labels "source" and "destination" as used in connection with the storage systems 102 and 104 assume an example in which data is to be migrated from the storage system 102 to the storage system 104. In other examples, if data is to be migrated from the storage system 104 to the storage system 102, then the storage system 104 can be referred to as a source storage system, and the storage system 102 can be referred to as a destination storage system.

The storage systems 102 and 104 are connected to a communication fabric 106, which can be implemented using any or some combination of a local area network (LAN), a wide area network (WAN), a storage area network (SAN), or any other type of network. A host system 108 is able to access the storage system 102 or 104 by issuing I/O requests to access data (read data and/or write data). The I/O requests issued by the host system 108 are transmitted over the communication fabric 106 to the storage system 102 or 104.

A host system includes a computing device (or multiple computing devices) that is (are) able to issue I/O requests. Examples of computing devices include a any or some combination of: a desktop computer, a notebook computer, a tablet computer, a server computer, a smart phone, a game appliance, an Internet-of-Things (IoT) device, and so forth.

Although just one host system 108 is shown in FIG. 1, it is noted that in other examples, multiple host systems 108 can access the storage system 102 or 104. Also, in other examples, there can be more than two storage systems.

FIG. 1 also shows a migration system 110 that includes a migration engine 112 for migrating data from the source storage system 102 to the destination storage system 104. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The migration system 110 can be separate from the source storage system 102 and the destination storage system 104. As used here, a "system" can refer to a computing device or a collection of computing devices.

In other examples, instead of implementing the migration engine 112 in the separate migration system 110, the migration engine 112 can instead be included in the source storage system 102 and/or in the destination storage system 104.

The source storage system 102 includes an array of storage devices 114, and the destination storage system 104 includes an array of storage devices 116. Although each storage system 102 or 104 is depicted with multiple storage devices, in other examples, the storage system 102 or 104 can include just one storage device.

The source storage system 102 includes virtual volumes arranged as a source collection 118 of source storage volumes. Data of the source storage volumes can be stored across the array of storage devices 114. The source collection 118 of source storage volumes is a consistency set of storage volumes that is to be migrated as a group as part of a data migration, such that if any of the source storage volumes of the source collection 118 is unable to be successfully migrated, then the data migration would be aborted.

The data migration transfers the data of the source storage volumes in the source collection 118 to a destination collection 122 of destination storage volumes in the destination storage system 104. The data of the destination storage volumes is stored across the array of storage devices 116 in the destination storage system 104.

In accordance with some implementations of the present disclosure, the migration engine 112 uses tracking data structures 124 that contain respective tracking information for tracking changes made to data portions in respective destination storage volumes of the destination collection 122. A tracking data structure 124 is activated for each destination storage volume as the transfer of an individual source storage volume completes.

In some examples, the tracking data structures 124 are stored in a memory 126 of the migration system 110. The memory 126 can be implemented using a memory device or a collection of memory devices, where each memory device can include any of a dynamic random access memory (DRAM) device, a static random access memory (SRAM) device, a flash memory device, or any other type of memory device.

In further examples, the tracking data structures 124 can be stored in a memory of destination storage system 104. In some examples, the tracking data structures 124 are maintained just for the destination storage volumes, and copies of the tracking data structures 124 are not maintained for the source storage volumes.

In alternative examples, copies of the tracking data structures 124 can also be stored in a memory of the source storage system 102. In such alternative examples, changes to the tracking data structures 124 for destination storage volumes can be synchronized (e.g., at periodic intervals or at other intervals) to the copies of the tracking data structures 124 at the source storage system 102.

A data migration can be initiated using any of various different techniques. For example, a user at a user device 130 can manually initiate the data migration from the source storage system 102 to the destination storage system 104. In some examples, an orchestrator engine 132 is accessible (over a network, which can be the communication fabric 106 or a different network) by the user device 130 to allow for initiation of the data migration. For example, the orchestrator engine 132 may be part of a server that can be accessed by the user device 130 over the network. The orchestrator engine 132 can present a user interface at the user device 130, at which the user of the user device 130 can make selections to initiate the data migration.

In other examples, a data migration can be initiated by a program or by a machine, based on detection of a triggering condition. For example, the triggering condition may be a condition where the source storage system 102 is experiencing errors or faults that may indicate that the source storage system 102 is about to fail.

Figure 2:
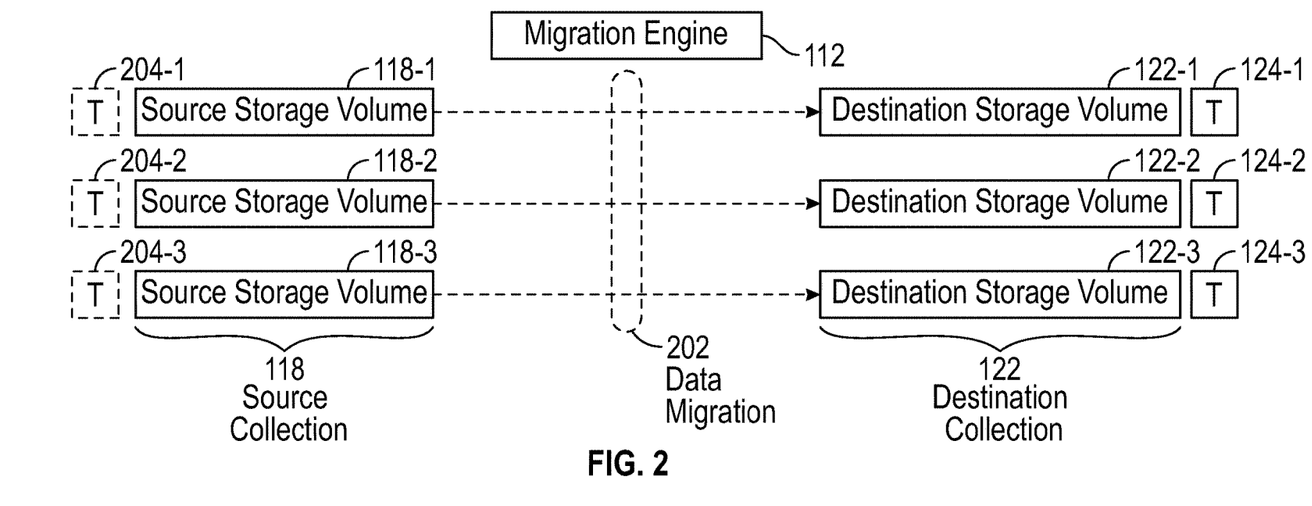
FIG. 2 is a block diagram of an arrangement to transfer data between source storage volumes and destination storage volumes, according to some examples.

FIG. 2 shows an example of data migration (202) of source storage volumes of the source collection 118 to respective destination storage volumes of the destination collection 122. The data migration (202) is managed by the migration engine 112.

In the example of FIG. 2, the source collection 118 includes source storage volumes 118-1, 118-2, and 118-3. Although the example refers to three source storage volumes, it is noted that in different examples, a different number (one or greater than one) of source storage volumes can be part of the source collection 118.

Data of the source storage volumes 118-1, 118-2, and 118-3 is to be transferred as part of the data migration (202) to respective destination storage volumes 122-1, 122-2, and 122-3, which are part of the destination collection 122.

In accordance with some implementations of the present disclosure, as the data of each source storage volume 118-$i$ ($i$=1 to 3) is individually transferred by the migration engine 112 to a corresponding destination storage volume 122-$i$, a respective tracking data structure 124-$i$ (one of 124-1, 124-2, 124-3 shown in FIG. 2) can be activated to track changes made to data portions in the respective destination storage volume 122-$i$ (one of 122-1, 122-2, 122-3).

In some examples, copies 204-1, 204-2, and 204-3 of the tracking data structures 124-1, 124-2, and 124-3 are maintained for the respective source storage volumes 118-1, 118-2, and 118-3. In other examples, the tracking data structure copies 204-1, 204-2, and 204-3 are not maintained for the respective source storage volumes 118-1, 118-2, and 118-3; in other words, no tracking data structures are maintained for the source storage volumes 118-1, 118-2, and 118-3. As an example, if the source storage system 102 (FIG. 1) does not support the use of tracking data structures, then such tracking data structures would not be maintained for the source storage volumes 118-1, 118-2, and 118-3.

Figure 3A:
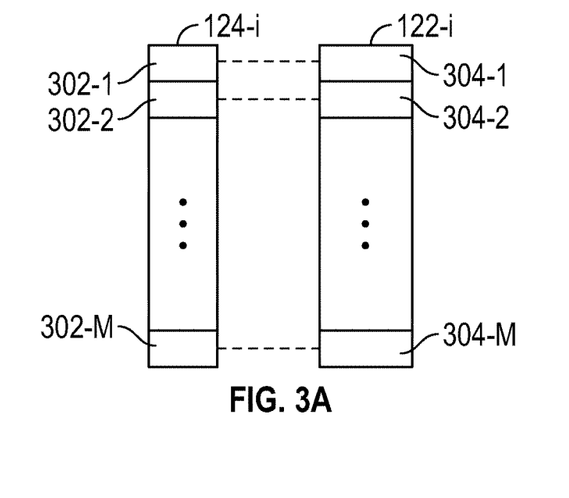
FIGS. 3A and 3B are block diagrams of tracking structures including tracking indicators mapped to respective data portions of storage volumes, according to various examples.

FIG. 3A shows an example of a tracking data structure 124-$i$ that is associated with a respective destination storage volume 122-$i$. In the example of FIG. 3A, the tracking information in the tracking data structure 124-$i$ includes a bitmap that has a number of tracking bits 302-1, 302-2, . . . , 302-M (M≥2) that correspond to respective data extents 304-1, 304-2, . . . , 304-M of the destination storage volume 122-$i$. Each data extent refers to a unit of storage space of a specified size.

If a tracking bit 302-$j$ ($j$=1 to M) is set to a first value (e.g., "0"), then that indicates that the respective data extent 304-$j$ has not been changed since the migration of data from the corresponding source storage volume 118-$i$ to the destination storage volume 122-$i$ completed. However, if the tracking bit 302-$j$ is set to a second value (e.g., "1") that is different from the first value, then that indicates that the respective data extent 304-$j$ has been changed (e.g., by a write operation) since the migration of data from the corresponding source storage volume 118-$i$ to the destination storage volume 122-$i$ completed.

Figure 3B:
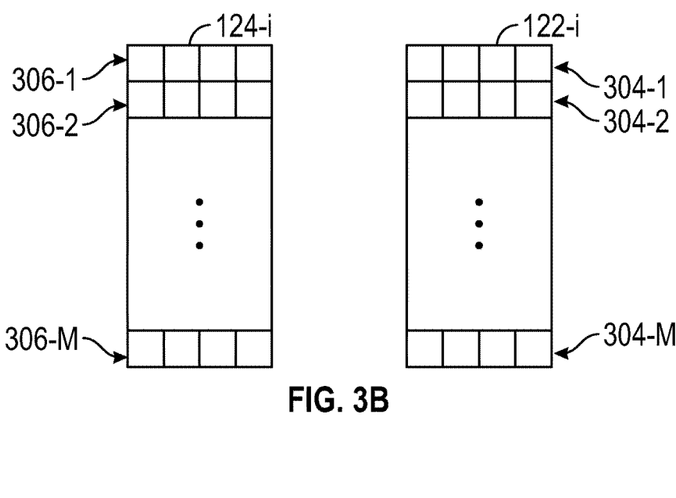

FIG. 3B shows a different example of the tracking data structure 124-$i$. In the example of FIG. 3B, the tracking information of the tracking data structure 124-i includes multi-bit tracking indicators 306-1, 306-2, . . . , 306-M, which correspond to respective data extents 304-1, 304-2, . . . , 304-M of the corresponding destination storage volume 122-$i$. Using a multi-bit tracking indicator 306-$j$ allows for tracking changes to sub-extents of each data extent 304-$j$ of the destination storage volume 122-$i$. Each data extent of the destination storage volume 122-$i$ is divided into sub-extents, and each bit of the multi-bit tracking indicator 306-$j$ can be used to track changes made to the corresponding sub-extent of the data extent 304-$j$ of the destination storage volume 122-$i$ More generally, the tracking information in the tracking data structure 124-$i$ includes tracking indicators to track changes made to corresponding data portions (data extents or sub-extents) of the destination storage volume 122-*i*. A tracking indicator is settable to respective different values for indicating data portions of the destination storage volume that have been changed.

As depicted in FIGS. 3A and 3B, the granularity of the tracking indicators can be variable that correspond to data portions of different sizes. The tracking indicators of FIG. 3A (tracking bits 302-1, 302-2, . . . , 302-M) are each of a first length (one bit in length) to track data portions of a first size (the size of a data extent). The tracking indicators of FIG. 3B (multi-bit tracking indicators 306-1, 306-2, . . . , 306-M) are each of a different second length (four bits in length) to track data portions of a second size (the size of a sub-extent) that is smaller than the first size. More generally, the granularity of the tracking indicators can be variably set, such as by a user, a program, a machine, or another entity, to track data portions of respective different sizes.

In the ensuing discussion, it is assumed that the tracking information of the tracking data structure 124-*i* includes tracking bits (e.g., 302-1, 302-2, . . . , 302-M in FIG. 3A) to track changes made to corresponding data extents.

When the data extent in the destination storage volume 122-*i* is changed after the migration of data from the corresponding source storage volume 118-*i* to the destination storage volume 122-*i* has completed, the corresponding tracking bit 302-*j* is changed from the first value to the second value. Note that the tracking bit 302-*j* remains at the second value regardless of how many times the data extent 304-*j* changes after the first change. Initially, each of the tracking bits 302-1, 302-2, . . . , 302-M is set to the first value since no data extents are changed when migration of data from a source storage volume 118-*i* to the corresponding destination storage volume 122-*i* initially completes.

By using the tracking data structures 124-1, 124-2, and 124-3, changed portions of the destination storage volumes 122-1, 122-2, and 122-3 can be tracked. When a rollback is to be performed from the destination storage volumes 122-1, 122-2, and 122-3 back to the source storage volumes 118-1, 118-2, and 118-3 (such as in response to an abort of the data migration, in response to a user request, etc.), the tracking information in the tracking data structures 124-1, 124-2, and 124-3 can be used to identify which data portions of destination storage volumes have changed, such that just those changed data portions are transferred back to the respective source storage volumes during the rollback. As a result, entire destination storage volumes do not have to be rolled back to the respective source storage volumes. By having to transfer just changed data portions of destination storage volumes identified by the tracking information for the rollback, the resource usage associated with the rollback operation can be reduced.

Moreover, in examples where tracking data structure copies (e.g., 204-1, 204-2, 204-3 in FIG. 2) are maintained for the source storage volumes 118-1, 118-2, and 118-3, the rollback can be considered an "instantaneous" rollback. When the rollback is initiated, I/O requests from host system(s) (referred to as "host I/O requests") can be directed to the source storage volumes 118-1, 118-2, and 118-3 even though changed data of the destination storage volumes 122-1, 122-2, and 122-3 has not yet been transferred back to the source storage volumes 118-1, 118-2, and 118-3. The rollback is "instantaneous" and the access of data of the rolled back storage volumes is "instantaneous" in the sense that the host I/O requests can be submitted to the source storage volumes 118-1, 118-2, and 118-3 without having to wait for completion of the transfer of the changed data portions of the destination storage volumes 122-1, 122-2, and 122-3 back to the source storage volumes 118-1, 118-2, and 118-3.

Once the tracking data structure copies 204-1, 204-2, and 204-3 (for the respective source storage volumes 118-1, 118-2, and 118-3) are synchronized with the tracking data structures 124-1, 124-2, and 124-3 (for the respective destination storage volumes 122-1, 122-2, and 122-3), then any host I/O requests for accessing data extents in the source storage volumes 118-1, 118-2, and 118-3 associated with changed data can be satisfied by retrieving the changed data from the destination storage volumes 122-1, 122-2, and 122-3.

In other examples where tracking data structure copies 204-1, 204-2, and 204-3 are not maintained for the source storage volumes 118-1, 118-2, and 118-3, then host I/O requests are temporarily blocked until changed data extents indicated by the tracking data structures 124-1, 124-2, and 124-3 are transferred back to the source storage volumes 118-1, 118-2, and 118-3.

In some examples, the migration engine 112 may stop tracking changed data portions within a given destination storage volume if an amount of changed data portions in the given destination storage volume exceeds a threshold (e.g., 70%, 85%, 90%, 95%, etc.) with respect to the total quantity of data portions in the given destination storage volume. When the amount of changed data portions exceeds the threshold, tracking can be turned off (the respective tracking data structure is disabled) to reduce the overhead associated with tracking changes. If tracking is turned off for the given destination storage volume, then the entire given destination storage volume would be copied back to the respective source storage volume for a rollback operation.

Figure 4:
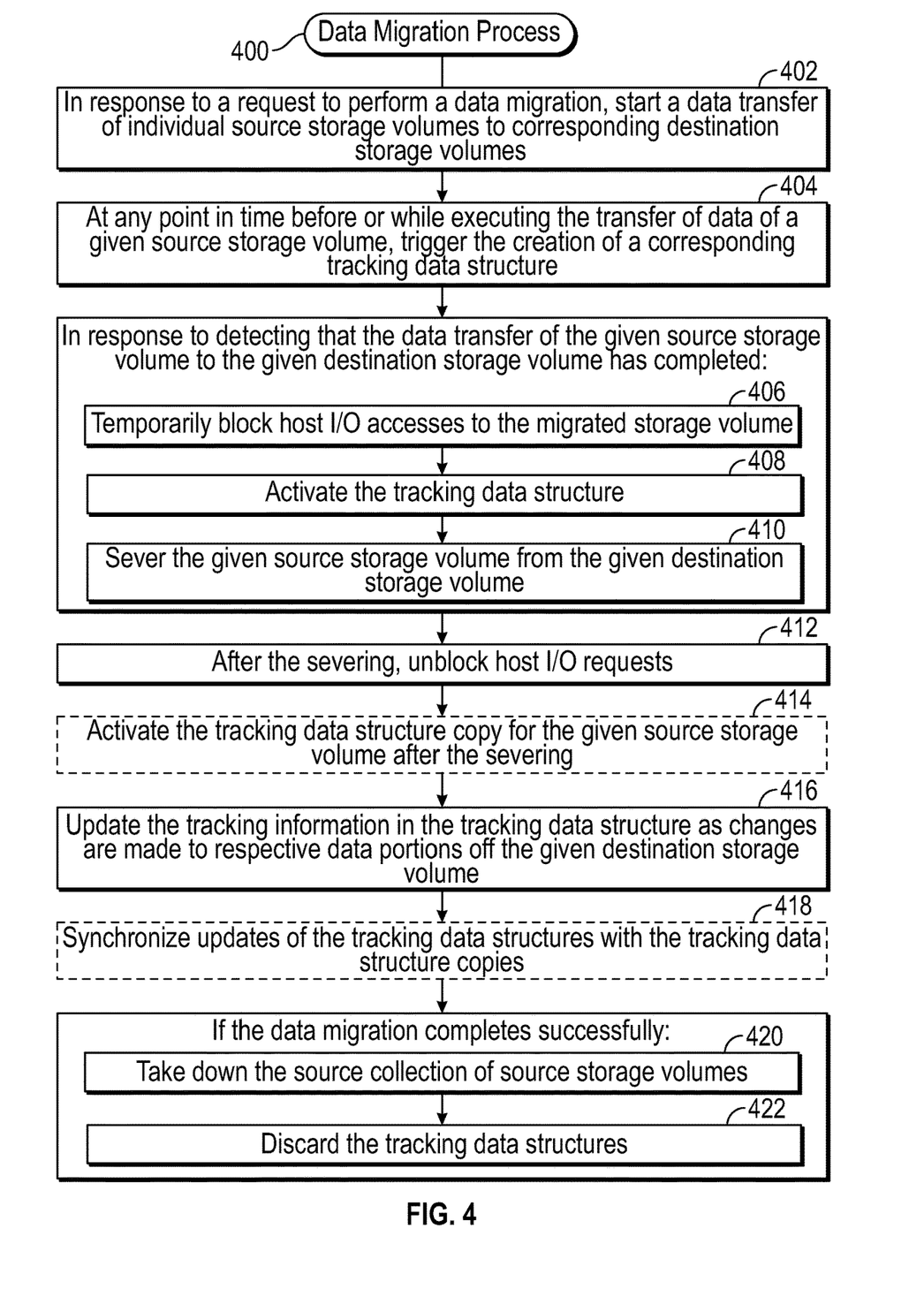
FIG. 4 is a flow diagram of a data migration process according to some examples.

FIG. 4 is a flow diagram of a data migration process 400 according to some implementations of the present disclosure. Although a specific sequence of tasks is shown in FIG. 4, it is noted that in other examples, the order of tasks can be changed, some tasks can be omitted, and additional tasks can be added.

In response to a request to perform a data migration (which may be initiated by the user device 130 of FIG. 1 or by another entity), the migration engine 112 can start (at 402) the data transfer of individual source storage volumes 118-1, 118-2, and 118-3 of the source collection 118 to the corresponding destination storage volumes 122-1, 122-2, and 122-3. The transfer of data of an individual source storage volume to a respective destination storage volume is performed independently of the transfer of data of another source storage volume to another destination storage volume.

At any point in time before or while executing the transfer of data of a given source storage volume 118-*i*, the migration engine 112 triggers (at 404) the creation of the corresponding tracking data structure 124-*i*. However, tracking is not activated yet since at this time the data transfer from the given source storage volume 118-*i* to the given destination storage volume 122-*i* has not yet completed. The created tracking data structure 124-*i* includes tracking indicators that are all set to the first value to indicate that no data portions have been changed.

In response to detecting that the data transfer of the given source storage volume 118-*i* to the given destination storage volume 122-*i* has completed, the migration engine 112 can perform the following tasks: temporarily blocks (at 406) host I/O accesses to the migrated storage volume (by performing I/O blocking), activate (at 408) the tracking data structure 124-*i* to start tracking changes to data portions of the given destination storage volume 122-*i*, and sever (at 410) the given source storage volume 118-*i* from the given destination storage volume 122-*i*.

Blocking host I/O requests to the migrated storage volume means that the host I/O requests are cached in a queue for later processing. The I/O requests are not actually allowed to be applied to the migrated storage volume (either the given source storage volume 118-*i* or the given destination storage volume 122-*i*). In accordance with some implementations of the present disclosure, the I/O blocking can be performed on a per-storage volume basis during the data migration, so that I/O blocking does not have to be implemented for the entire collection of storage volumes.

The severing of the given source storage volume 118-*i* from the given destination storage volume 122-*i* causes host I/O requests to be redirected to the given destination storage volume 122-*i*, and further causes stopping of mirroring of data changes at the given destination storage volume 122-*i* back to the given source storage volume 118-*i*.

After the severing of the given source storage volume 118-*i* from the given destination storage volume 122-*i*, host I/O requests are unblocked (at 412) and allowed to be processed with respect to the given destination storage volume 122-*i*.

In examples where the tracking data structure copies 204-1, 204-2, and 204-3 (FIG. 2) are maintained for the source storage volumes 118-1, 118-2, and 118-3, the migration engine 112 also activates (at 414) the tracking data structure copy 204-*i* for the given source storage volume 118-*i* after the severing.

In examples where the tracking data structure copies 204-1, 204-2, and 204-3 (FIG. 2) are not maintained for the source storage volumes 118-1, 118-2, and 118-3, task 414 is omitted.

The migration engine 112 updates (at 416) the tracking information in the tracking data structure 124-*i* as changes are made to respective data portions of the given destination storage volume 122-*i*. Note that host I/O requests are allowed to make changes to the given destination storage volume 122-*i* even though other source storage volume(s) is (are) still being in the process of being migrated to other destination storage volume(s).

The foregoing process (including tasks 404, 406, 408, 410, 412, 414, and 416) is repeated for each source storage volume that is migrated to a corresponding destination storage volume.

In examples where the tracking data structure copies 204-1, 204-2, and 204-3 (FIG. 2) are maintained for the source storage volumes 118-1, 118-2, and 118-3, the migration engine 112 can synchronize (at 418) updates of the tracking data structures 124-1, 124-2, and 124-3 with the tracking data structure copies 204-1, 204-2, and 204-3. Note that the synchronization performed at 418 transfers just changed parts of each tracking data structure 124-*i* to the respective tracking data structure copy 204-*i*; the underlying data is not transferred from the destination storage volume 122-*i* to the source storage volume 118-*i*.

In examples where the tracking data structure copies 204-1, 204-2, and 204-3 (FIG. 2) are not maintained for the source storage volumes 118-1, 118-2, and 118-3, task 418 is omitted.

If the data migration completes successfully, then the migration engine 112 takes down (at 420) the source collection 118 of source storage volumes, and discards (at 422) the tracking data structures 124. Taking down the source collection 118 of source storage volumes means that the source storage volumes are deactivated or deleted.

FIG. 4 refers to an example of a successful data migration such that rollback is not performed.

However, if a problem occurs during the data migration such that rollback is to be performed from destination storage volumes (that have completed migration) back to the respective source storage volumes, then the migration engine 112 can perform the following tasks.

Figure 5:
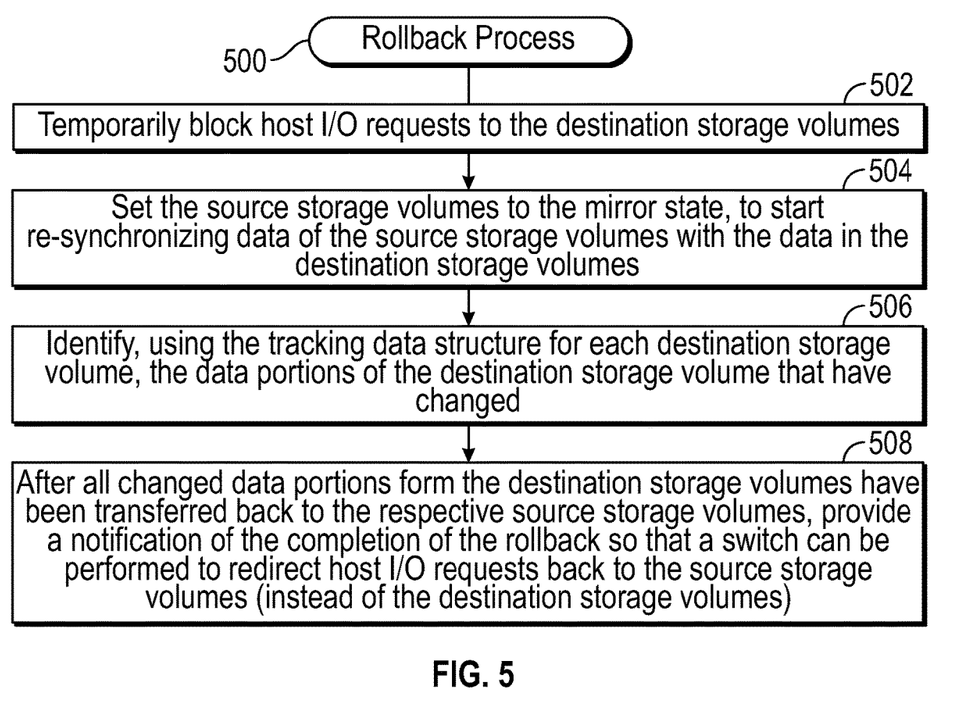
FIGS. 5 and 6 are flow diagrams of rollback processes according to various examples.

FIG. 5 shows an example rollback process 500 in which the rollback is performed in an arrangement where the tracking data structures 124-1, 124-2, and 124-3 are maintained for the destination storage volumes 122-1, 122-2, and 122-3, but the tracking data structure copies 204-1, 204-2, and 204-3 are not maintained for the source storage volumes 118-1, 118-2, and 118-3. Although a specific sequence of tasks is shown in FIG. 5, it is noted that in other examples, the order of tasks can be changed, some tasks can be omitted, and additional tasks can be added.

Figure 6:
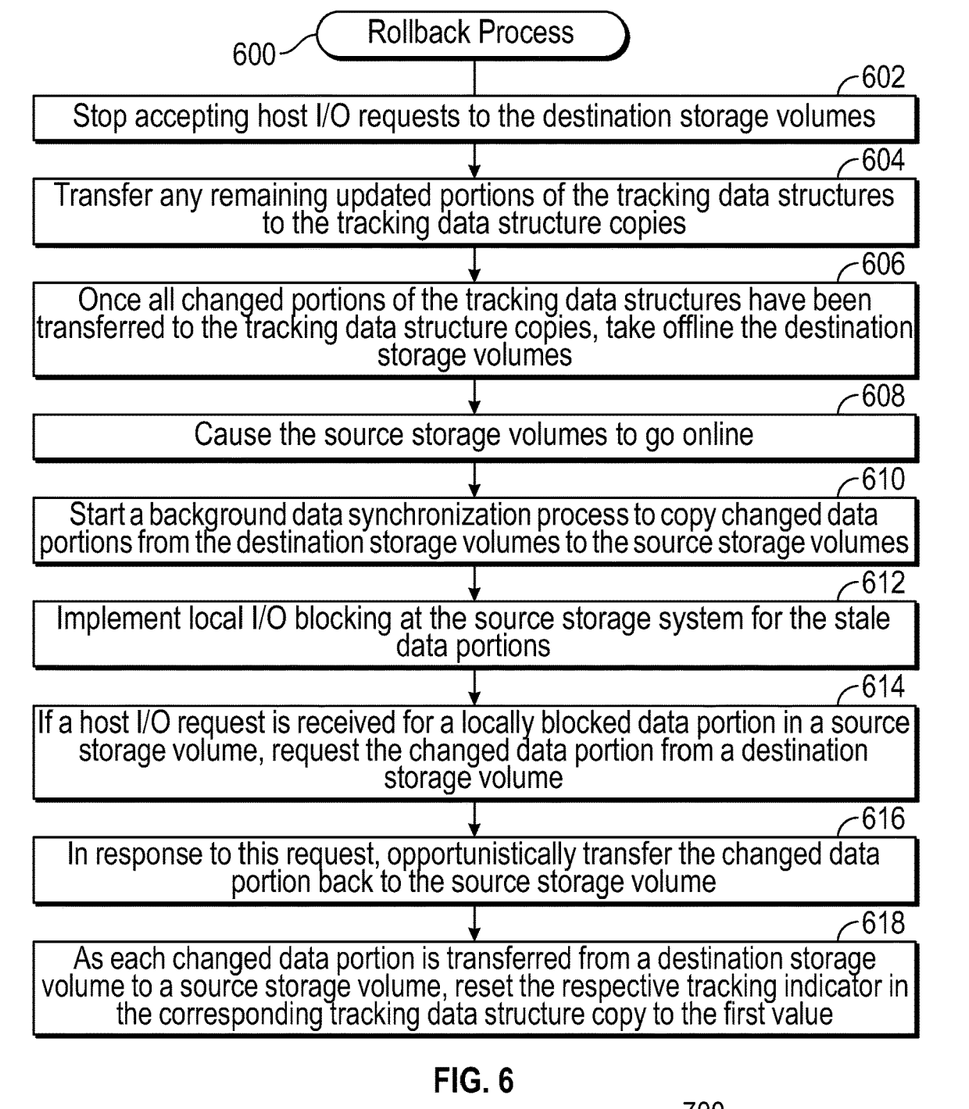

FIG. 6 shows an example rollback process 600 in which the rollback is performed in an arrangement where the tracking data structures 124-1, 124-2, and 124-3 are maintained for the destination storage volumes 122-1, 122-2, and 122-3, and also where the tracking data structure copies 204-1, 204-2, and 204-3 are maintained for the source storage volumes 118-1, 118-2, and 118-3. Although a specific sequence of tasks is shown in FIG. 6, it is noted that in other examples, the order of tasks can be changed, some tasks can be omitted, and additional tasks can be added.

As shown in FIG. 5, when rollback is initiated, such as due to the migration engine 112 detecting that an error or fault has occurred during the data migration, or in response to a request from a user, a program, or a machine, the migration engine 112 temporarily blocks (at 502) host I/O requests to the destination storage volumes 122-1, 122-2, and 122-3.

The migration engine 112 can set (at 504) the source storage volumes 118-1, 118-2, and 118-3 to the mirror state, to start re-synchronizing data of the source storage volumes 118-1, 118-2, and 118-3 with the data in the destination storage volumes 122-1, 122-2, and 122-3.

The migration engine 112 identifies (at 506), using the tracking data structure 124-*i* for each destination storage volume 122-*i*, the data portions of the destination storage volume 122-*i* that have changed. The changed data portions of each destination storage volume 122-*i* are transferred back to the respective source storage volume 118-*i*, to reestablish a fully synchronized mirror (i.e., the source storage volume 118-*i* is an identical copy of the destination storage volume 122-*i*). This data transfer is considered a "push" operation in the sense that the destination storage system 104 pushes the changed data portions back to the source storage system 102, since the source storage system 102 does not have tracking data structures to track what data portions have changed and thus is unable to request retrieval of the changed data portions.

After all changed data portions from the destination storage volumes 122-1, 122-2, and 122-3 have been transferred back to the respective source storage volumes 118-1, 118-2, and 118-3, the rollback is complete, and the migration engine 112 can provide (at 508) a notification of the completion of the rollback so that a switch can be performed to redirect host I/O requests back to the source storage volumes (instead of the destination storage volumes).

As noted above, FIG. 5 shows an example in which tracking data structure copies are not maintained for source storage volumes.

In another example shown in FIG. 6, tracking data structures are maintained for both source and destination storage volumes.

As shown in FIG. 6, when rollback is initiated, such as due to the migration engine 112 detecting that an error or fault has occurred during the data migration, or in response to a request from a user, a program, or a machine, the migration engine 112 causes the destination storage system 104 to stop (at 602) accepting host I/O requests to the destination storage volumes 122-1, 122-2, and 122-3 (by performing I/O blocking). As noted above, this rollback is an instantaneous rollback.

The migration engine 112 transfers (at 604) any remaining updated portions of the tracking data structures 124-1, 124-2, and 124-3 (that have not yet been synchronized with the tracking data structure copies 204-1, 204-2, and 204-3) to the tracking data structure copies 204-1, 204-2, and 204-3. In some cases, most of the updated portions of the tracking data structures 124-1, 124-2, and 124-3 would have been synchronized with the tracking data structure copies 204-1, 204-2, and 204-3 as part of the periodic synchronization between the tracking data structures.

Once all changed portions of the tracking data structures 124-1, 124-2, and 124-3 have been transferred to the tracking data structure copies 204-1, 204-2, and 204-3, the destination storage volumes 122-1, 122-2, and 122-3 can be taken offline (at 606) (i.e., host I/O requests are no longer directed to the destination storage volumes 122-1, 122-2, and 122-3).

The migration engine 112 causes the source storage volumes 118-1, 118-2, and 118-3 to go online (at 608), so that host I/O requests are directed to the source storage volumes 118-1, 118-2, and 118-3. Note that at this time, some of the data portions in the source storage volumes 118-1, 118-2, and 118-3 may be stale, since the changed data portions may not yet have been transferred from the destination storage volumes 122-1, 122-2, and 122-3 back to the source storage volumes 118-1, 118-2, and 118-3.

The source storage system 102 can also start (at 610) a background data synchronization process to copy changed data portions (as indicated by the tracking data structure copies 204-1, 204-2, and 204-3) from the destination storage volumes 122-1, 122-2, and 122-3 to the source storage volumes 118-1, 118-2, and 118-3.

Further, local I/O blocking (at 612) may be implemented at the source storage system 102 for the stale data portions, which may be indicated by the tracking data structure copies 204-1, 204-2, and 204-3. If a host I/O request is received for a locally blocked data portion in a source storage volume (i.e., the host I/O request is attempting to access data indicated by a the tracking data structure copy 204-$i$ as being changed), then the source storage system 102 can request (at 614) the changed data portion from a destination storage volume. Note that the requested changed data portion is out of order with respect to the background data synchronization process started at 608, in which changed data portions are transferred back in a particular order (e.g., increasing order or decreasing order of data portion identifiers).

In response to this request, the changed data portion is opportunistically transferred (at 616) back to the source storage volume. In some examples, the requests submitted by the source storage system 102 for changed data portions of the destination storage volumes can be assigned a higher priority so that such changed data portions can be returned to the source storage system 102 in a more timely manner.

As each changed data portion is transferred from a destination storage volume to a source storage volume (either opportunistically or as part of the background synchronization process), the respective tracking indicator in the corresponding tracking data structure copy 204-$i$ can be reset (at 618) to the first value.

Once all of the changed data portions have been copied from the destination storage volumes 122-1, 122-2, and 122-3 to the source storage volumes 118-1, 118-2, and 118-3 (using the background data synchronization process and the opportunistic transfer process), a fully synchronized mirror (i.e., the source collection 118 of source storage volumes is an identical copy of the destination collection 122 of destination storage volumes) is established, and the rollback operation is complete.

After rollback is completed to the source collection 118 of source storage volumes, a roll forward operation can be performed from the source collection 118 of source storage volumes to the destination collection 122 of destination storage volumes. "Roll forward" refers to a process in which the data migration is re-initiated following the rollback, to complete the data migration following the rollback. In the roll forward operation, the roles of the tracking data structures 204-1, 204-2, and 204-3 and 124-1, 124-2, and 124-3 are reversed. In the roll forward operation, the tracking data structures 204-1, 204-2, and 204-3 track changed data portions in response to host I/O requests to the source storage volumes 118-1, 118-2, and 118-3. Updates to the tracking data structures 204-1, 204-2, and 204-3 can be intermittently synchronized to the tracking data structures 124-1, 124-2, and 124-3, and once the data of each of the source storage volumes 118-1, 118-2, and 118-3 has been transferred to the destination storage volumes 122-1, 122-2, and 122-3, the tracking data structures 124-1, 124-2, and 124-3 can be used to transfer changed data portions of the source storage volumes 118-1, 118-2, and 118-3 to the destination storage volumes 122-1, 122-2, and 122-3 (both opportunistically and as part of a background synchronization) to complete the roll forward operation.

Figure 7:
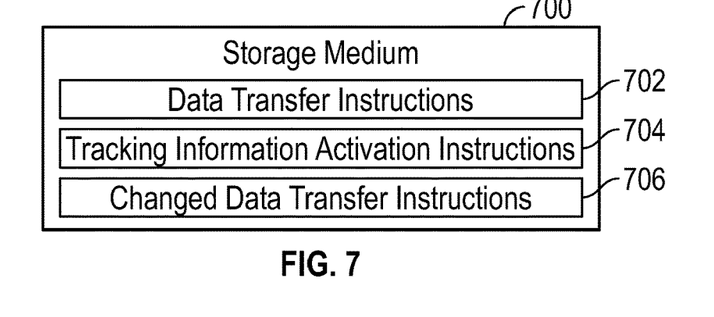
FIG. 7 is a block diagram of a storage medium storing machine-readable instructions according to some examples.

FIG. 7 is a block diagram of a non-transitory machine-readable or computer-readable storage medium 700 storing machine-readable instructions that upon execution cause a system to perform various tasks. The system can be any or a combination of the migration system 110, the source storage system 102, or the destination storage system 104, for example.

The machine-readable instructions include data transfer instructions 702 to, in a first transfer operation, transfer data of a first storage volume of a first storage location to a second storage volume for a second storage location. The data transfer can be part of a data migration, or part of a rollback, or part of a roll forward, or part of any other type of data transfer.

In some examples, the first storage volume is part of a consistency set of storage volumes that is to be transferred from the first storage location to the second storage location by the first transfer operation.

The machine-readable instructions include tracking information activation instructions 704 to, responsive to a completion of the transfer of data of the first storage volume to the second storage volume, activate tracking information to track changes to data portions of the second storage volume, the tracking information including a plurality of tracking indicators that map to respective different data portions of the second storage volume. The tracked changes include overwriting previous data in the data portions without maintaining a copy of the previous data at the second storage location.

In some examples, tracking information activated for destination storage volumes corresponding to a first subset of individual storage volumes of the consistency set of storage volumes allows for writes to be performed with respect to the destination storage volumes while data of a second subset of individual storage volumes of the consistency set of storage volumes has not completed transfer.

As changes are made to the second storage volume due to host I/O writes, indicators of a first subset of the plurality of indicators are set to a first value to indicate corresponding data portions of the second storage volume have not changed, and indicators of a second subset of the plurality of indicators are set to a different second value to indicate corresponding data portions of the second storage volume have changed.

In some examples, host input/output (I/O) requests targeting the first storage volume are blocked on an individual storage volume basis, rather than the entire consistency set of storage volumes.

The machine-readable instructions include changed data transfer instructions 706 to, as part of a second transfer operation following the first transfer operation, transfer changed data indicated by the tracking information from the second storage volume to the first storage volume, without transferring unchanged data in the second storage volume to the first storage volume. The transfer of changed data can be part of a data transfer for a rollback following abort of data migration, or part of data transfer for a roll forward following a rollback, and so forth.

In some examples, based on the tracking information, a data portion of the second storage volume that has changed relative to the first storage volume is identified, and the changed data is pushed from the identified data portion of the second storage volume to the first storage volume. This operation can be performed in examples where a source storage system does not support use of the tracking information.

In further examples where both the source and destination storage systems support use of tracking information, a copy of the tracking information is activated for the first storage volume, and the copy of the tracking information at the source storage system is used to identify a data portion of the second storage volume that has changed relative to the first storage volume.

Figure 8:
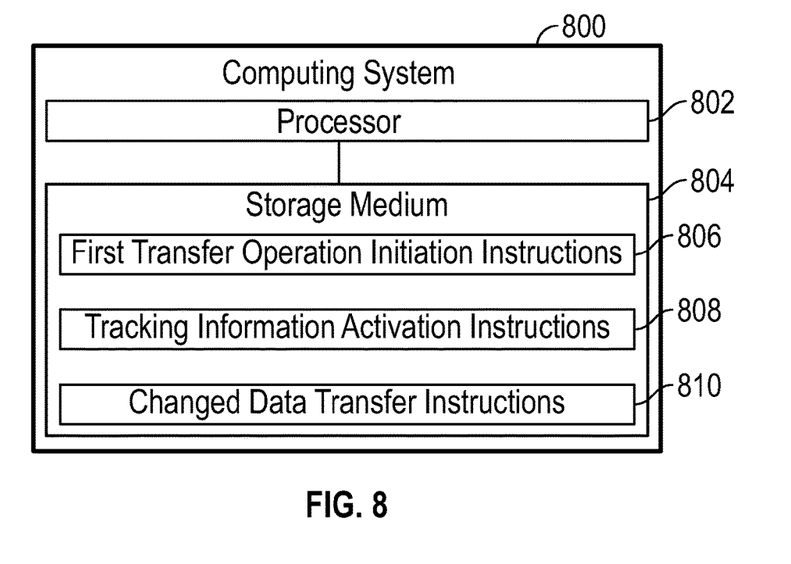
FIG. 8 is a block diagram of a computing system according to some examples.

FIG. 8 is a block diagram of a computing system 800, which can be any or a combination of the migration system 110, the source storage system 102, or the destination storage system 104.

The computing system 800 includes a hardware processor 802 (or multiple hardware processors). A hardware processor can include a microprocessor, a core of a multi-core microprocessor, a microcontroller, a programmable integrated circuit, a programmable gate array, or another hardware processing circuit.

The computing system 800 further includes a non-transitory storage medium 804 storing machine-readable instructions executable on the hardware processor 802 to perform various tasks. Machine-readable instructions executable on a hardware processor can refer to the instructions executable on a single hardware processor or the instructions executable on multiple hardware processors.

The machine-readable instructions stored in the storage medium 804 include first transfer operation initiation instructions 806 to initiate a first transfer operation to transfer data of a consistency set of storage volumes from a first storage location to a second storage location, where a completion of the first transfer operation is based on a completion of transfer of data of each of the storage volumes in the consistency set of storage volumes.

The machine-readable instructions further include tracking information activation instructions 808 to, in response to a completion of an individual storage volume of the consistency set of storage volumes to a respective destination storage volume for the second storage location, activate respective tracking information to track changes to portions of the respective destination storage volume, the respective tracking information including a plurality of tracking indicators that map to respective different data portions of the respective destination storage volume. The tracked changes include overwriting previous data in the data portions without maintaining a copy of the previous data at the second storage location.

In some examples, tracking information associated with a further destination storage volume for which data has not completed transfer from a corresponding individual storage volume of the consistency set of storage volumes is not activated.

The machine-readable instructions further include changed data transfer instructions 810 to, as part of a second transfer operation following the first transfer operation, transfer changed data indicated by the respective tracking information from the respective destination storage volume to the individual storage volume, without transferring unchanged data in the respective destination storage volume to the individual storage volume.

In some examples, the second transfer operation (e.g., a rollback) is initiated responsive to a fault condition associated with the first transfer operation.

In further examples, the second transfer operation (e.g., a roll forward) is initiated responsive to a completion of the first transfer operation.

Figure 9:
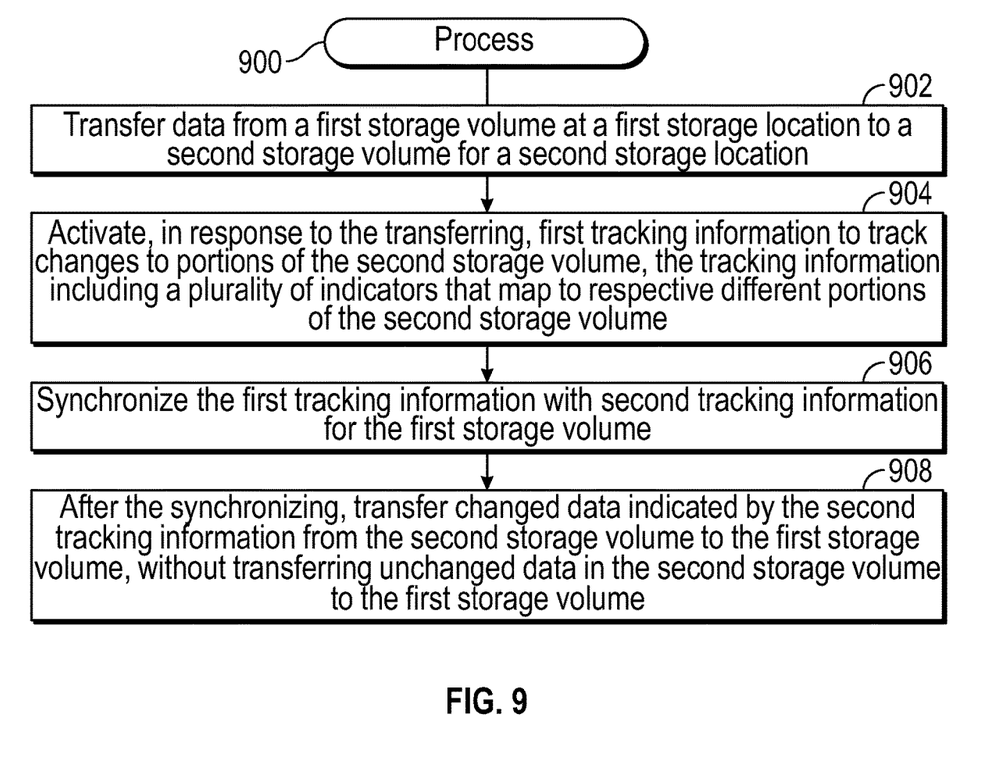
FIG. 9 is a flow diagram of a process according to some examples.

FIG. 9 is a flow diagram of a process 900 according to some examples. The process 900 can be performed by any or a combination of the migration system 110, the source storage system 102, or the destination storage system 104. Although a specific sequence of tasks is shown in FIG. 9, it is noted that in other examples, the order of tasks can be changed, some tasks can be omitted, and additional tasks can be added.

The process 900 includes transferring (at 902) data from a first storage volume at a first storage location to a second storage volume for a second storage location.

The process 900 includes activating (at 904), in response to the transferring, first tracking information to track changes to portions of the second storage volume, the tracking information including a plurality of indicators that map to respective different portions of the second storage volume.

The process 900 includes synchronizing (at 906) the first tracking information with second tracking information for the first storage volume.

The process 900 includes, after the synchronizing, transferring (at 908) changed data indicated by the second tracking information from the second storage volume to the first storage volume, without transferring unchanged data in the second storage volume to the first storage volume.

In accordance with some implementations of the present disclosure, by using the tracking information to track updates at destination storage volumes, the size of collections of source storage volumes that can be migrated does not have to be restricted, since resource usage is made more efficient during a rollback as a result of using the tracking information to identify changed data portions of the destination storage volumes.

Also, the rollback can be performed in an online manner without any service interruption.

A storage medium (e.g., 700 in FIG. 7 or 804 in FIG. 8) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

in a transfer operation, transfer data of a source storage volume at a source storage system to a destination storage volume at a destination storage system;

responsive to a completion of the transfer of data of the source storage volume to the destination storage volume, activate destination tracking information to track changes to data portions of the destination storage volume, the destination tracking information comprising a plurality of indicators that map to respective different data portions of the destination storage volume, wherein indicators of a first subset of the plurality of indicators are set to a first value to indicate corresponding data portions of the destination storage volume have not changed, and indicators of a second subset of the plurality of indicators are set to a different second value to indicate corresponding data portions of the destination storage volume have changed; and as part of a rollback operation following the transfer operation;

synchronize the destination tracking information with source tracking information for the source storage volume, the source tracking information comprising a plurality of indicators that map to respective different data portions of the source storage volume, wherein each indicator of the plurality of indicators of the source tracking information indicates whether or not a corresponding data portion of the different data portions of the source storage volume has changed, and wherein the synchronizing comprises transferring, to the source tracking information, the second subset of the plurality of indicators of the destination tracking information set to the second value, after the synchronizing, transition the source storage volume online, and after the synchronizing and the transitioning, transfer changed data indicated by the source tracking information from the destination storage volume to the source storage volume, without transferring unchanged data in the destination storage volume to the source storage volume.

2. The non-transitory machine-readable storage medium of claim 1, wherein the source storage volume is part of a consistency set of storage volumes that is to be transferred from the source storage system to the destination storage system by the first transfer operation, wherein the instructions upon execution cause the system to:

block host input/output (I/O) requests targeting the source storage volume of the consistency set of storage volumes on an individual storage volume basis.

3. The non-transitory machine-readable storage medium of claim 2, wherein the instructions upon execution cause the system to:

as part of the transfer of the consistency set of storage volumes, activate a respective destination tracking information for each corresponding individual destination storage volume to which data of a respective individual storage volume of the consistency set of storage volumes has completed transfer.

4. The non-transitory machine-readable storage medium of claim 3, wherein the destination tracking information activated for destination storage volumes corresponding to a first subset of individual storage volumes of the consistency set of storage volumes allows for writes to be performed with respect to the destination storage volumes while data of a second subset of individual storage volumes of the consistency set of storage volumes has not completed transfer.

5. The non-transitory machine-readable storage medium of claim 1, wherein the instructions upon execution cause the system to:

in response to a completion of the synchronizing in which the second subset of the plurality of indicators of the destination tracking information has been transferred to the source tracking information:

transition the destination storage volume offline, and after transitioning the destination storage volume offline and the source storage volume online, perform the transferring of the changed data from the destination storage volume to the source storage volume as a background data synchronization process.

6. The non-transitory machine-readable storage medium of claim 5, wherein the instructions upon execution cause the system to:

during the background data synchronization process:

receive an input/output (I/O) request for a first data portion of the source storage volume for which a respective indicator in the source tracking information is set to a value indicating that the first data portion has been changed at the destination storage volume, and in response to the I/O request, obtain, by the source storage system, the changed first data portion from the destination storage volume to fulfill the I/O request.

7. The non-transitory machine-readable storage medium of claim 6, wherein the obtaining of the changed first data portion from the destination storage volume is out of order with respect to an order of transferring changed data portions of the background data synchronization process.

8. The non-transitory machine-readable storage medium of claim 1, wherein the instructions upon execution cause the system to:
use the source tracking information at the source storage system to identify a data portion of the destination storage volume that has changed relative to the source storage volume.

9. The non-transitory machine-readable storage medium of claim 6, wherein the transitioning of the destination storage volume offline causes host input/output (I/O) requests to no longer be directed to the destination storage volume, and the transitioning of the source storage volume online causes host I/O requests to be directed to the source storage volume.

10. The non-transitory machine-readable storage medium of claim 1, wherein the instructions upon execution cause the system to:
in response to a transfer of a changed data portion from the destination storage volume to the source storage volume as part of the rollback operation, reset a respective indicator in the source tracking information from the second value to the first value.

11. The non-transitory machine-readable storage medium of claim 1, wherein the rollback operation is an instantaneous rollback based on the synchronizing of the destination tracking information with the source tracking information.

12. A computing system comprising:
a processor; and
a non-transitory storage medium storing instructions executable on the processor to:
initiate a transfer operation to transfer data of a source storage volume at a source storage system to a destination storage volume at a destination storage system;
in response to a completion of an individual the transfer of data of the source storage volume to the destination storage volume, activate destination tracking information to track changes to data portions of the destination storage volume, the destination tracking information comprising a plurality of indicators that map to respective different data portions of the respective destination storage volume, wherein indicators of a first subset of the plurality of indicators are set to a first value to indicate corresponding data portions of the destination storage volume have not changed, and indicators of a second subset of the plurality of indicators are set to a different second value to indicate corresponding data portions of the destination storage volume have changed; and
as part of a rollback operation following the first transfer operation;
synchronize the destination tracking information with source tracking information for the source storage volume, the source tracking information comprising a plurality of indicators that map to respective different data portions of the source storage volume, wherein each indicator of the plurality of indicators of the source tracking information indicates whether or not a corresponding data portion of the different data portions of the source storage volume has changed, and wherein the synchronizing comprises transferring, to the source tracking information, the second subset of the plurality of indicators of the destination tracking information set to the second value,
after the synchronizing, transition the source storage volume online, and
after the synchronizing and the transitioning, transfer changed data indicated by the source tracking information from the destination storage volume to the source storage volume, without transferring unchanged data in the destination storage volume to the source storage volume.

13. The computing system of claim 12, wherein the instructions are executable on the processor to:
in response to a completion of the synchronizing in which the second subset of the plurality of indicators of the destination tracking information has been transferred to the source tracking information:
transition the destination storage volume offline, and
after the transitioning of the source storage volume online and the destination storage volume offline, perform the transferring of the changed data from the destination storage volume to the source storage volume as a background data synchronization process.

14. The computing system of claim 12, wherein the instructions are executable on the processor to:
initiate the rollback operation responsive to a fault condition associated with the first transfer operation.

15. The computing system of claim 12, wherein the destination tracking information has variable granularity to track data portions of different sizes.

16. The computing system of claim 13, wherein the instructions are executable on the processor to:
during the background data synchronization process:
receive an input/output (I/O) request for a first data portion of the source storage volume for which a respective indicator in the source tracking information is set to a value indicating that the first data portion has been changed at the destination storage volume, and
in response to the I/O request, obtain, by the source storage system, the changed first data portion from the destination storage volume to fulfill the I/O request, wherein the obtaining of the changed first data portion from the destination storage volume is out of order with respect to an order of transferring changed data portions of the background data synchronization process.

17. A method of a system comprising a hardware processor, comprising:
transferring data from a source storage volume at a source storage system to a destination storage volume at a destination storage system;
in response to the transferring, activating destination tracking information to track changes to data portions of the destination storage volume, the destination tracking information comprising a plurality of indicators that map to respective different data portions of the destination storage volume, wherein each indicator of the plurality of indicators of the destination tracking information indicates whether or not a corresponding data portion of the different data portions of the destination storage volume has changed;
as part of a rollback of data from the destination storage volume to the source storage volume, synchronizing the destination tracking information with source tracking information for the source storage volume, the source tracking information comprising a plurality of indicators that map to respective different data portions of the source storage volume, wherein each indicator of the plurality of indicators of the source tracking information indicates whether or not a corresponding data portion of the different data portions of the source storage volume has changed, and wherein the synchronizing comprises transferring updated indicators of the destination tracking information to the source tracking information, the updated indicators each set to a value indicating that respective data portions of the destination storage volume have changed with respect to corresponding data portions of the source storage volume;

after the synchronizing, transitioning the source storage volume online, and after the synchronizing and the transitioning, transferring, as part of the rollback, changed data indicated by the source tracking information from the destination storage volume to the source storage volume, without transferring unchanged data in the destination storage volume to the source storage volume.

18. The method of claim 17, comprising:

in response to a completion of the synchronizing in which the updated indicators of the destination tracking information have been transferred to the source tracking information:

transitioning the destination storage volume offline, and after transitioning the destination storage volume offline and the source storage volume offline, performing the transferring of the changed data from the destination storage volume to the source storage volume as a background data synchronization process.

19. The method of claim 18, comprising:

during the background data synchronization process:

receiving a request for a first data portion of the source storage volume for which a respective indicator in the source tracking information is set to a value indicating that the first data portion has been changed at the destination storage volume, and in response to the request, obtaining, by the source storage system, the changed first data portion from the destination storage volume.

20. The method of claim 19, wherein the obtaining of the changed first data portion from the destination storage volume is out of order with respect to an order of transferring changed data portions of the background data synchronization process.

* * * * *